(12) United States Patent
Harda et al.

(10) Patent No.: US 10,304,332 B2
(45) Date of Patent: May 28, 2019

(54) METHOD AND SYSTEM FOR MAINTAINING A DATABASE COMPRISING REPORTED TRAFFIC-AFFECTING EVENTS

(71) Applicant: VOLVO CAR CORPORATION, Gothenburg (SE)

(72) Inventors: Peter Harda, Torslanda (SE); Joakim Lin Sorstedt, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 11 days.

(21) Appl. No.: 15/636,835

(22) Filed: Jun. 29, 2017

(65) Prior Publication Data

US 2018/0012493 A1    Jan. 11, 2018

(30) Foreign Application Priority Data

Jul. 8, 2016   (EP) .................................... 16178513

(51) Int. Cl.
*G08G 1/0967*    (2006.01)
*G01C 21/28*    (2006.01)
(Continued)

(52) U.S. Cl.
CPC ....... *G08G 1/096775* (2013.01); *G01C 21/28* (2013.01); *G08G 1/0112* (2013.01); *G08G 1/0129* (2013.01); *G08G 1/04* (2013.01); *G08G 1/096708* (2013.01); *G08G 1/096716* (2013.01); *G08G 1/096758* (2013.01); *G08G 1/096844* (2013.01)

(58) Field of Classification Search
None
See application file for complete search history.

(56) References Cited

U.S. PATENT DOCUMENTS 9,047,773 B2    6/2015   Chen et al.
2016/0042644 A1    2/2016   Velusamy

FOREIGN PATENT DOCUMENTS

EP    2442291 A1    4/2012
EP    3032221 A1    6/2016

OTHER PUBLICATIONS

Extended European Search Report dated Jan. 26, 20176, Application No. 16178513.4—1803, Applicant Volvo Car Corporation, 7 Pages.

*Primary Examiner* — John Olszewski
*Assistant Examiner* — Gerrad A Foster
(74) *Attorney, Agent, or Firm* — Brooks Kushman P.C.

(57) ABSTRACT

A method performed by a database managing system for maintaining a database comprising reported traffic-affecting events is provided. The system derives a position of a first vehicle supporting detection of vehicle surroundings and determines by comparing the vehicle position to positions of reported traffic-affecting events comprised in the database, that the first vehicle is approaching at least a first traffic-affecting event. The system prompts the first vehicle to attempt to detect the first traffic-affecting event, which prompting comprises providing to the first vehicle an expected position of the first traffic-affecting event. The system receives a response from the first vehicle, which response indicates whether or not the expected position was at least partly unobstructedly observable by the first vehicle. The response further indicates—if the expected position was at least partly unobstructedly observable—whether or not the first traffic-affecting event was at least partly detected by the first vehicle.

20 Claims, 7 Drawing Sheets

(51) Int. Cl.
*G08G 1/0968* (2006.01)
*G08G 1/01* (2006.01)
*G08G 1/04* (2006.01)

METHOD AND SYSTEM FOR MAINTAINING A DATABASE COMPRISING REPORTED TRAFFIC-AFFECTING EVENTS

CROSS-REFERENCE TO RELATED APPLICATIONS

This application claims foreign priority benefits under 35 U.S.C. § 119(a)-(d) to European patent application number EP 16178513.4, filed Jul. 8, 2016, which is incorporated by reference in its entirety.

TECHNICAL FIELD

The present disclosure relates to a database managing system and a method performed therein, for maintaining a database comprising reported traffic-affecting events.

BACKGROUND

It is known within the art that road traffic, especially fully autonomously driven vehicles commonly known as self-driving vehicles, may benefit from deriving information from a database of events affecting the drivability, for instance on a lane level. Such a database may typically comprise information of traffic-affecting events on—or by the side of—the road, for instance relating to road debris, broken-down vehicles, slow-moving vehicles, etc., reported by and subsequently added to the database by different sources such as e.g., emergency authorities.

A database discussed above comprising up-to-date information may support tactical driving, for instance regarding choice of lanes and timing of lane changes. However, keeping the information related to the traffic-affecting events in the database updated, is challenging. For instance, the knowledge that a vehicle with detection capacity has travelled along a road where a traffic-affecting event has been recorded—without reporting the event again—may typically not be sufficient to conclude that the event is no longer relevant and that the event subsequently may be cleared from the database.

U.S. Pat. No. 9,047,773, for instance, relates to an exceptional road-condition warning system for a vehicle. The system may notice the driver and passenger in advance to respond to an exceptional road condition before the vehicle approaches the occurring place of the road condition through a back-end cooperative self-learning mechanism. However, although the back-end cooperative self-learning mechanism disclosed in U.S. Pat. No. 9,047,773 may collect the exceptional road condition from different vehicles and update the database automatically to maintain the accuracy, keeping a database of traffic-affecting events up-to-date, remains a challenge.

SUMMARY

It is therefore an object of embodiments herein to provide an approach for in an improved and/or alternative manner maintaining a detailed database of reported traffic-affecting events.

According to a first aspect of embodiments herein, the object is achieved by a method performed by a database managing system for maintaining a database comprising reported traffic-affecting events. The database is associated with a system supporting communication with one or more vehicles. The database managing system derives a position of a first vehicle supporting detection of vehicle surroundings. The database managing system moreover determines—by comparing the vehicle position to positions of reported traffic-affecting events comprised in the database—that the first vehicle is approaching at least a first traffic-affecting event. Furthermore, the database managing system prompts the first vehicle to attempt to detect the first traffic-affecting event, which prompting comprises providing to the first vehicle an expected position of the first traffic-affecting event. The database managing system further receives a response from the first vehicle, which response indicates whether or not the expected position was at least partly unobstructedly observable by the first vehicle. If the expected position was at least partly unobstructedly observable, the response further indicates whether or not the first traffic-affecting event was at least partly detected by the first vehicle. Moreover, the database managing system updates—in the database—information associated with the first traffic-affecting event, depending on the response.

Thereby, an approach is provided according to which a detailed database of reported traffic-affecting events is maintained, e.g., database-stored information related to reported traffic-affecting events, is kept up-to-date. That is, since a position of a first vehicle supporting detection of vehicle surroundings, is derived, a location of a vehicle—which vehicle is adapted to sense its environment—is established. Moreover, since it is determined—by comparison of the vehicle position to positions of reported traffic-affecting events comprised in the database—that the first vehicle is approaching at least a first traffic-affecting event, it may be established by considering the derived vehicle position of the first vehicle in view of database-stored positions of reported traffic-affecting events, that said first vehicle is heading toward—and/or has reached—a traffic-affecting event. Furthermore, since the first vehicle is prompted to attempt to detect the first traffic-affecting event, which prompting comprises providing to the first vehicle an expected position of the first traffic-affecting event, instructions are provided to the first vehicle to try to verify the first traffic-affecting event. Since further a response is received from the first vehicle, which response indicates whether or not the expected position was at least partly unobstructedly observable by the first vehicle, a response is provided from the first vehicle to the database managing system which reveals if the first vehicle was able or not to—at least to some extent—unobstructedly observe the expected position. That is, the response indicates whether or not the first vehicle was able to observe—in an at least partly unobstructed manner, i.e., without for instance another object, such as a vehicle, or a condition, such as a weather condition, such as fog, etc., obstructing the ability to observe—the expected position. Accordingly, the database managing system may derive from said response whether or not e.g., an obstructing object such as truck, and/or an obstructing condition such as fog and/or e.g., dirt on an optional on-board surroundings detections device, prevented the first vehicle from observing said expected position. Moreover, since the response—if the expected position was at least partly unobstructedly observable—further indicates whether or not the first traffic-affecting event was at least partly detected by the first vehicle, the response from the first vehicle to the database managing system may additionally reveal whether or not the first traffic-affecting event at least to some extent was sensed by the first vehicle. Furthermore, since information associated with the first traffic-affecting event is updated in the database depending on the response, data related to the first traffic-affecting event is updated in the database in dependence of the content of the response.

Accordingly, as the response indicates a potential inability to observe the expected position of the first traffic-affecting event, information of the database related to the first traffic-affecting event may be updated with greater confidence as compared to approaches in the prior art.

For that reason, an approach is provided for in an improved and/or alternative manner maintaining a detailed database of reported traffic-affecting events.

The technical features and corresponding advantages of the above mentioned method will be discussed in further detail in the following.

By introducing a method performed by a database managing system for maintaining a database comprising reported traffic-affecting events, an approach is provided according to which a detailed database of reported traffic-affecting events is maintained, e.g., database-stored information related to reported traffic-affecting events, is kept up-to-date. The expression "database managing system" may refer to "database updating system", whereas "maintaining" throughout this disclosure may refer to "updating", "updating information in" and/or "keeping up-to-date". Moreover, "a database" may refer to "at least a first database", whereas "database" may refer to "digital storage" and/or "cloud-based database". Furthermore, a database "comprising" reported traffic-affecting events may refer to a database "holding", "storing", "containing" and/or "comprising information of" reported traffic-affecting events. The expression "traffic-affecting events" may refer to "traffic-affecting road events", "traffic-affecting incidents" and/or "traffic conditions", whereas "reported" traffic-affecting events may refer to "stored" and/or "reported and stored" traffic-affecting events. The traffic-affecting events stored in the database may have been reported and/or added from arbitrary sources, such as for instance as commonly known in the art by authorities, emergency services, floating vehicle data, wirelessly connected vehicles, crowd-sourcing, social media, etc. Optionally, the database is comprised in the database managing system.

Since the database is associated with a system supporting communication with one or more vehicles, information in the database may as commonly known in the art be based on data derived from said one or more vehicles. Additionally or alternatively, vice versa, information in the database may as commonly known be derived from the database and provided to said one or more vehicles. The expression that the database is "associated with" a system supporting communication with one or more vehicles, may refer to that the database is "connected to", "adapted to communicate with", "comprised in" and/or "comprising" a system supporting communication with one or more vehicles. "A system" supporting communication with one or more vehicles, may refer to "a control system", "a back-end system", "a management system", "one or more services", "one or more functions", "one or more servers", and/or "one or more automotive clouds adapted for cloud-based storage" supporting communication with one or more vehicles. Moreover, the expression "system supporting communication with" one or more vehicles, may refer to "system adapted to communicate with" one or more vehicles, "system adapted for wirelessly transmitting data to and/or receiving data from" one or more vehicles, and/or "system supporting wireless communication with" one or more vehicles. Said system may for instance refer to a commonly known system adapted to wirelessly communicate with one or more vehicles, remotely control functionality of said vehicles and/or hold information associated with said vehicles; for instance a management and/or assisting system such as e.g., Volvo On Call. The database managing system may for instance be fully or at least partly comprised such a commonly known system discussed above, and/or be associated therewith e.g., adapted to communicate therewith. "Vehicle" may refer to any arbitrary vehicle, and may for instance refer to an engine-propelled vehicle, such as car, truck, lorry, van, bus, motor cycle, scooter, tractor, military vehicle, air plane, drone, flying or floating vessel, boat etc., or a rail-bound vehicle, such as e.g., a train or tram. "Vehicle" may further refer to a vehicle being partially and/or fully autonomous vehicle. The vehicle may further be adapted to have online abilities, as commonly known in the art, for instance to be able to communicate e.g., wirelessly, for instance with the system discussed above supporting communication with one or more vehicles.

Since the database managing system derives a position of a first vehicle supporting detection of vehicle surroundings, a location of a vehicle—which vehicle is adapted to sense its environment—is established. The expression "a first vehicle" may refer to "at least a first vehicle" and/or "a selected vehicle", whereas "supporting detection of vehicle surroundings" may refer to "adapted to support detection of vehicle surroundings", "adapted for being able to detect vehicle surroundings", "adapted to detect vehicle surroundings", and/or "comprising and/or having on-board one or more surroundings detection devices". Moreover, the expression detection of "vehicle surroundings" may refer to detection of "an environment at least partly surrounding the first vehicle", whereas "detection" may refer to "sensing". Detection of vehicle surroundings may be accomplished as commonly known in the art, for instance by means of one or more—and/or a combination of one or more of—a commonly known camera, radar, laser, lidar, and/or ultrasound, which may support detection of vehicle surroundings for instance in an essentially forward direction of the vehicle, and/or up to for instance 360 degrees around the vehicle. "A position" of the first vehicle may refer to "a relative position", "from a digital map a position", "from a digital map a mapped position", "from a digital map a relative position", "a geographical position", "a GPS position", "one or more coordinates" and/or "a horizontal position" of the first vehicle, and furthermore to "a current and/or essentially current position" of the first vehicle. The expression "deriving" a position may throughout this disclosure refer to "determining", "calculating", "requesting", "fetching", "receiving" and/or "downloading" a position, e.g., from a digital map onto which a position of the vehicle has been mapped as known in the art. Moreover, "deriving" a position may refer to "deriving with support from said system" a position, and/or "deriving from said system" a position. "Deriving a position" may further refer to "deriving a determined position", which position may have been determined by the first vehicle as commonly known in the art, for instance based on digital map data and global positioning etc., and subsequently—as commonly known—been provided to said system. According to an example, "deriving a position" of the first vehicle optionally comprises "deriving a position and a travel direction" of the first vehicle. Thereby, by additionally deriving a travel direction of the first vehicle—which may be accomplished as commonly known in the art—the whereabouts of the first vehicle may be established to a greater extent, for instance in which direction the first vehicle is heading.

Since the database managing system determines—by comparing the vehicle position to positions of reported traffic-affecting events comprised in the database—that the first vehicle is approaching at least a first traffic-affecting event, it may be established by considering the derived vehicle position of the first vehicle in view of database-stored positions of reported traffic-affecting events, that said first vehicle is heading toward—and/or has reached—a traffic-affecting event. Determining that a first vehicle is approaching at least a first traffic-affecting event may be accomplished as commonly known in the art, and "determining" may in this context refer to "deriving" and/or "calculating". The expression "determining by comparing" may refer to "determining based on comparing". The expression that the first vehicle "is approaching" at least a first traffic-affecting event, may refer to that the first vehicle "is deemed to approach", "is approaching and/or has reached", "is heading toward", "is estimated to arrive at" and/or "within a predetermined distance and/or within a predetermined time is estimated to arrive at" at least a first traffic-affecting event. "Positions" of reported traffic-affecting events comprised in the database, may refer to "relative position", "positions in a digital map", "mapped positions onto a digital map", relative positions on a digital map", "geographical positions", "stored positions", "derived positions" and/or "reported positions" of reported traffic-affecting events comprised in the database. Moreover, "positions of" reported traffic-affecting events may refer to "GPS positions of", "one or more coordinates of", "horizontal positions of" and/or "locations, areas and/or regions of" reported traffic-affecting events. Accordingly, a position of a reported traffic-affecting event may in fact refer to a plurality of positions and/or a geometrically defined e.g., geographical section, which in addition to indicating the location of the reported traffic-affecting event as well may indicate a lateral and/or longitudinal extension thereof, sometimes greater than the actual extension of the traffic-affecting event. According to an example, the database managing system determines that the first vehicle is approaching at least a first traffic-affecting event, by additionally comparing the optionally derived vehicle heading direction, to positions of reported traffic-affecting events comprised in the database.

Since the database managing system prompts the first vehicle to attempt to detect the first traffic-affecting event, which prompting comprises providing to the first vehicle an expected position of the first traffic-affecting event, instructions are provided to the first vehicle to try to verify said event. "Prompting" the first vehicle may refer to "requesting", "instructing", "ordering" and/or "communicating wirelessly to" the first vehicle, and further to "prompting with support from said system" the first vehicle. Moreover, "attempt to detect" the first traffic-affecting event may refer to "attempt to verify", "try to detect" and/or "attempt to detect by means of one or more on-board surroundings detection devices" the first traffic-affecting event. "Providing" may refer to "transmitting", "sending" and/or "providing wirelessly". The expression "an expected position" of the first traffic-affecting event, may refer to "an expected relative position", "an expected relative position in a digital map", "an expected mapped position on a digital map", "an expected relative position on a digital map", "an expected geographical position", "a stored position", "a reported position", "at least a first expected position", "one or more coordinates" and/or "an expected location, area and/or region" of the first traffic-affecting event. According to an example, the expression "providing to the first vehicle an expected position of the first traffic-affecting event", may refer to "providing to the first vehicle an expected position of the first traffic-affecting event, said expected position being based on the information that is available to the database managing system". Moreover, additional information related to the traffic-affecting event, such as characteristics thereof, type of event, time indication of when the event e.g., initially occurred and/or duration thereof, may additionally be provided to the first vehicle.

According to an example, prompting—as discussed above—the first vehicle to attempt to detect the first traffic-affecting event, may comprise providing a verification request message to the at least first vehicle, which verification request message prompts the first vehicle to attempt to detect the first traffic-affecting event. The verification request message then indicates an expected position of the first traffic-affecting event. "Verification request message" may refer to a message of any arbitrary format commonly known in the art receivable, and further interpretable, by a vehicle.

Since the database managing system receives a response from the first vehicle, which response indicates whether or not the expected position was at least partly unobstructedly observable by the first vehicle, a response is provided from the first vehicle to the database managing system which reveals if the first vehicle was able or not to—at least to some extent—unobstructedly observe the expected position. That is, the response indicates whether or not the first vehicle was able to observe—in an at least partly unobstructed manner, i.e., without for instance another object, such as a vehicle, or a condition, such as a weather condition, such as fog, etc., obstructing the ability to observe—the expected position and/or a region comprising the expected position. Accordingly, the database managing system may derive from said response whether or not e.g., an obstructing object such as truck, and/or an obstructing condition such as fog and/or e.g., dirt on an optional on-board surroundings detections device, prevented the first vehicle from observing said expected position. Consequently, since the received response indicates if the first vehicle was able to observe the expected position of the first traffic-affecting event or not as described above, the uncertainty arising in the prior art—when a vehicle supporting detection of vehicle surroundings passes by a reported traffic-affecting event without detecting and subsequently confirming and/or reporting said traffic-affecting event—of whether said traffic-affecting event is still valid or not, is mitigated. "Receiving" a response may refer to "deriving" and/or "downloading" a response, and further to "receiving with support from said system" a response. Moreover, "response indicating" may refer to "response reflecting and/or comprising" and/or "content of the response indicating", whereas the expression "whether or not" throughout this disclosure may refer to "if". "Observable by" the first vehicle may refer to "detectable by", "observed by" and/or "detected by" the first vehicle, and further to "observable by one or more on-board surroundings detection devices of" the first vehicle. Moreover, "unobstructedly observable by the first vehicle" may refer to "observable by the first vehicle without being obstructed by e.g., an obstructing object and/or an obstructing condition".

Moreover, since the response—if the expected position was at least partly unobstructedly observable—further indicates whether or not the first traffic-affecting event was at least partly detected by the first vehicle, the response from the first vehicle to the database managing system additionally reveals—in case said expected position was at least partly unobstructedly observable—whether or not the first traffic-affecting event at least to some extent was sensed by the first vehicle. Accordingly, the database managing system may then additionally derive from said response if the first traffic-affecting event was at least partly detected by the first vehicle, or not. The expression "at least partly" may throughout this disclosure refer to "at least to some extent" and/or "determined to be at least partly".

According to an example, additionally or alternatively, receiving a response from the first vehicle as discussed above, may optionally comprise receiving a verification message from the first vehicle comprising said response. "Verification message" may refer to a message of any arbitrary format commonly known in the art receivable, and further interpretable, by the database managing system.

Since the database managing system updates—in the database—information associated with the first traffic-affecting event, depending on the response, data related to the first traffic-affecting event is updated in the database in dependence of the content of the response. Accordingly, as the response indicates a potential inability to observe the expected position of the first traffic-affecting event, the database managing system may update information of the database related to the first traffic-affecting event, with greater confidence as compared to approaches in the prior art. That is, said information, such as the presence of the event in the database and/or a stored position thereof, may for instance be modified, deleted, confirmed, verified and/or validated. It may moreover be noted that the database not necessarily is updated, should for instance the response indicate that the expected position was not at least partly unobstructedly observable by the first vehicle. That is, if the response indicates that the expected position was not at least partly unobstructedly observable by the vehicle, then nor may the first vehicle have been able to detect the first traffic-affecting event. "Updating" may refer to "modifying", "changing", "adjusting", "adapting", "deleting", "validating", "verifying" and/or "confirming", whereas "information" may refer to "data", "fields", "posts" and/or "attributes". Moreover, information "associated with" the first traffic-affecting event may refer to information "related to" and/or "pertinent" the first traffic-affecting event, and further to information "associated with a position, road section and/or region of" the first traffic-affecting event, and/or information "associated with validity of" the first traffic-affecting event. The expression "depending on" the response may refer to "based on", "taking into consideration", "in view of", and/or "depending on the content of" the response.

Optionally, updating information as discussed above may further comprise evaluating deleting the reported first traffic-affecting event from the database, when the response indicates:

that the expected position was at least partly unobstructedly observable by the first vehicle, and that the first traffic-affecting event was not detected by the first vehicle.

Thereby, the reported first traffic-affecting event may be considered to be deleted from the database with great and/or satisfying confidence, since the response reveals that the first vehicle was able to satisfyingly observe the expected position of the first traffic-affecting event and further that the traffic-affecting event was not detected—thus not present or valid and/or no longer present or valid—at the expected position. "Evaluating deleting" the reported first traffic-affecting event may refer to "evaluate whether to delete", "considering deleting", "deleting", "evaluating removing" and/or "evaluating suppressing" the reported first traffic-affecting event, whereas the expression "when the response indicates" may refer to "if and/or in case the response indicates". Deletion of the reported first-traffic-affecting event from the database may for instance take place when "enough" vehicles have provided responses respectively indicating that the first traffic-affecting event was not detected given that the expected position was at least partly unobstructedly observable. "Enough" vehicles may for instance refer to a number of vehicles exceeding a predetermined deletion threshold, e.g., indicating a level of at least 2, at least 5 or at least 8 vehicles. Moreover, the expression "that said first traffic-affecting event was not detected by the first vehicle", may refer to "that said expected position did not contain and/or was clear from said first traffic-affecting event".

Optionally, the response discussed in the foregoing may further indicate a position—detected by the first vehicle—of the first traffic-affecting event, wherein updating information as discussed above further may comprise modifying and/or confirming in the database a currently stored position of the first traffic-affecting event, based on the position indicated by the response. Thereby, the currently stored position of the first traffic-affecting event may be modified and/or confirmed taking into consideration the position of the first traffic-affecting event detected by the first vehicle and subsequently revealed by the response. For instance, the position may be modified in a lateral and/or longitudinal direction of a road along which the first vehicle is travelling. "Modifying" may refer to "changing", "adjusting" and/or "adapting", whereas "confirming" may refer to "verifying" and/or "validating".

Optionally, updating information as discussed above may further comprise updating in the database—based on the position indicated by the response—one or more outer boundaries of a fictive zone comprising the first traffic-affecting event, in which fictive zone partial or fully autonomous driving is at least partly restricted. Thereby, a previously set hypothetical safety zone surrounding and/or encompassing the first traffic-affecting event, in which zone partial or fully autonomous driving to some extent may be prohibited due to relative nearness to the first traffic-affecting event, may be adjusted and/or narrowed down to in an improved manner reflect the position of the first traffic-affecting event detected by the first vehicle. That is, a fictive zone comprising the first traffic-affecting event—such as e.g., a road section—initially reported to and set in the database for instance by an emergency service, may e.g., extend along a sometimes unnecessarily extensive stretch of road, due to e.g., uncertainties regarding the position of the first traffic-affecting event. Thus, upon updating outer limits of such a fictive geographical zone—e.g., on a digital map—based on the position indicated by the response, the zone in which partial or fully autonomous driving at least to some extent is restricted, is adjusted to better reflect the detected updated location of the first traffic-affecting event.

Optionally, the first traffic-affecting event is situated on and/or near a road, and is selected from the group consisting of: an object affecting drivability and/or accessibility of the road, an accident, a slow-moving vehicle, a stationary vehicle, a vulnerable road user, an end of a queue of vehicles, a bad weather condition, debris, and/or a pothole or the like. The expression "near" a road may refer to "adjacent" a road. Moreover, a "vulnerable road user"—commonly referred to as a VRU—may refer to a pedestrian, bicyclist, rollerblader, skater, skateboarder, etc., whereas a "bad weather condition" for instance may refer to a flooding, a heavy rainfall, fog, etc.

Optionally, at least one reported and confirmed or non-confirmed traffic-affecting event comprised in a database of the database managing system may be stored for future reference together with any or all data concerning that traffic-affecting event. For example a date and/or time at which a traffic-affecting event first appeared in a database and a date and time at which it was removed or deleted therefrom may be stored, together with any received response concerning that traffic-affecting event including information concerning the sender. Such a historic log may prove useful in determining the cause of an accident for example.

According to a second aspect of embodiment herein, the object is achieved by a database managing system adapted for maintaining a database comprising reported traffic-affecting events, which database is associated with a system supporting communication with one or more vehicles. The database managing system comprises a position deriving unit adapted for deriving a position of a first vehicle supporting detection of vehicle surroundings. The managing system further comprises an event approach determining unit adapted for determining by comparing the vehicle position to positions of reported traffic-affecting events comprised in the database, that the first vehicle is approaching at least a first traffic-affecting event. Moreover, the database managing system comprises a verification prompting unit adapted for prompting the first vehicle to attempt to detect the first traffic-affecting event, which prompting comprises providing to the first vehicle an expected position of the first traffic-affecting event. The database managing system furthermore comprises a response receiving unit adapted for receiving a response from the first vehicle, which response indicates whether or not the expected position was at least partly unobstructedly observable by the first vehicle. The response further indicates—if the expected position was at least partly unobstructedly observable—whether or not the first traffic-affecting event was at least partly detected by the first vehicle. Moreover, the database managing system comprises a database updating unit adapted for updating, in the database, information associated with the first traffic-affecting event, depending on the response.

Optionally, the database updating unit may further be adapted for evaluating deleting the reported first traffic-affecting event from the database, when the response indicates:

that the expected position was at least partly unobstructedly observable by the first vehicle, and that the first traffic-affecting event was not detected by the first vehicle.

Optionally, the response may further indicate a position—detected by the first vehicle—of the first traffic-affecting event. The database updating unit may then further be adapted for modifying and/or confirming in the database a currently stored position of the first traffic-affecting event, based on the position indicated by the response.

Optionally, the database updating unit may further be adapted for updating in the database, based on the position indicated by the response, one or more outer boundaries of a fictive zone comprising the first traffic-affecting event, in which fictive zone partial or fully autonomous driving is at least partly restricted.

Optionally, the first traffic-affecting event may be situated on and/or near a road, and may then further be selected from the group consisting of an object affecting drivability and/or accessibility of said road, an accident, a slow-moving vehicle, a stationary vehicle, a vulnerable road user, an end of a queue of vehicles, a bad weather condition, debris, and/or a pothole or the like.

Similar advantages as those mentioned in the foregoing in relation to the first aspect correspondingly apply to the second aspect, which is why these advantages are not further discussed.

According to a third aspect of embodiments herein, the object is achieved by one or more servers and/or automotive clouds comprising at least a portion—e.g., the position deriving unit, the event approach determining unit, the verification prompting unit, the response receiving unit, and/or the database updating unit—of the database managing system discussed above. Again, similar advantages as those mentioned in the foregoing in relation to the first aspect correspondingly apply to the third aspect, which is why these advantages are not further discussed.

According to a fourth aspect of embodiments herein, the object is achieved by a computer program product comprising a computer program containing computer program code means arranged to cause a computer or a processor to execute the steps of the database managing system discussed above, stored on a computer-readable medium or a carrier wave. Yet again, similar advantages as those mentioned in the foregoing in relation to the first aspect correspondingly apply to the fourth aspect, which is why these advantages are not further discussed.

According to a fifth aspect of embodiments herein, the object is achieved by a method performed by a traffic-affecting event verifying system on-board a vehicle supporting detection of vehicle surroundings, for maintaining a—remotely positioned—database comprising reported traffic-affecting events. The database is associated with a system supporting communication with one or more vehicles. The traffic-affecting event verifying system determines a position of the vehicle, and provides the vehicle position—e.g., directly or indirectly to the database managing system discussed above. The traffic-affecting event verifying system moreover receives—e.g., directly or indirectly from the database managing system discussed above—a request to attempt to detect at least a first traffic-affecting event, which the vehicle is approaching. The request comprises an expected position of the first traffic-affecting event. Furthermore, the traffic-affecting event verifying system observes the expected position. The traffic-affecting event verifying system further provides a response—e.g., directly or indirectly to the database managing system discussed above—which response indicates whether or not the expected position was at least partly unobstructedly observable by the vehicle. The response further indicates—if the expected position was at least partly unobstructedly observable—whether or not the first traffic-affecting event was at least partly detected by the vehicle. Again, similar advantages as those mentioned in the foregoing in relation to the first aspect correspondingly apply to the fifth aspect, which is why these advantages are not further discussed.

According to a sixth aspect of embodiments herein, the object is achieved by a traffic-affecting event verifying system on-board a vehicle supporting detection of vehicle surroundings, adapted for maintaining a—remotely positioned—database comprising reported traffic-affecting events. The database is associated with a system supporting communication with one or more vehicles. The traffic-affecting event verifying system comprises a position determining unit adapted for determining a position of the vehicle and a position providing unit adapted for providing the vehicle position. The traffic-affecting event verifying system further comprises a request receiving unit adapted for receiving a request to attempt to detect at least a first traffic-affecting event, which first traffic-affecting event the vehicle is approaching, and which request comprises an expected position of the first traffic-affecting event. Moreover, the traffic-affecting event verifying system comprises an expected position observing unit adapted for observing the expected position. The traffic-affecting event verifying system further comprises a response providing unit adapted for providing a response, which response indicates whether or not the expected position was at least partly unobstructedly observable by the first vehicle. The response further indicates—if the expected position was at least partly unobstructedly observable—whether or not the first traffic-affecting event was at least partly detected by the first vehicle. Yet again, similar advantages as those mentioned in the foregoing in relation to the first aspect correspondingly apply to the sixth aspect, which is why these advantages are not further discussed.

According to a seventh aspect of embodiments herein, the object is achieved by a vehicle comprising at least a portion—such as the position determining unit, the position providing unit, the request receiving unit, the expected position observing unit, and/or the response providing unit—of the traffic-affecting event verifying system discussed above. The vehicle supports detection of vehicle surroundings. Again, similar advantages as those mentioned in the foregoing in relation to the first aspect correspondingly apply to the seventh aspect, which is why these advantages are not further discussed.

According to an eight aspect of embodiments herein, the object is achieved by a method performed by a traffic-affecting event managing system, which traffic-affecting event managing system comprises the method performed by the database managing system discussed above, intertwined with the method performed by the traffic-affecting event verifying system discussed above. Similar advantages as those mentioned in the foregoing in relation to the first aspect correspondingly apply to the eight aspect, which is why these advantages are not further discussed.

According to a ninth aspect of embodiments herein, the object is achieved a traffic-affecting event managing system, which traffic-affecting event managing system comprises the database managing system discussed above and the traffic-affecting event verifying system discussed above. Similar advantages as those mentioned in the foregoing in relation to the first aspect correspondingly apply to the ninth aspect, which is why these advantages are not further discussed.

BRIEF DESCRIPTION OF THE DRAWINGS

Various aspects of non-limiting embodiments of the disclosure, including particular features and advantages, will be readily understood from the following detailed description and the accompanying drawings.

DETAILED DESCRIPTION

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to maintaining a database comprising reported traffic-affecting events, there will be disclosed an approach according to which a detailed database of reported traffic-affecting events is maintained, e.g., database-stored information related to reported traffic-affecting events, is kept up-to-date.

Figure 1:
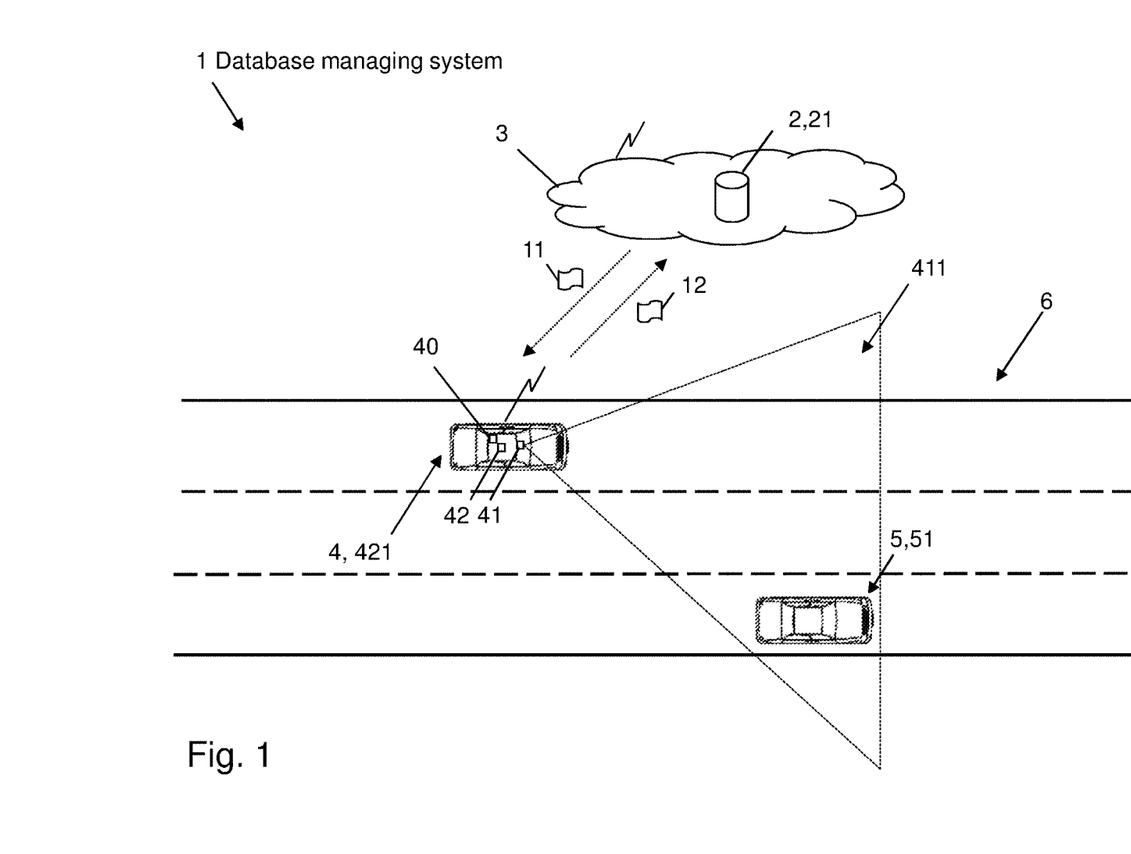
FIG. 1 illustrates a schematic overview of an exemplifying database managing system according to embodiments of the disclosure.

Referring now to the figures and FIG. 1 in particular, there is illustrated a schematic overview of an exemplifying database managing system 1 according to embodiments of the disclosure. The database managing system 1 is adapted for maintaining a database 2 comprising reported traffic-affecting events. The database managing system 1 is here at least partly comprised in one or more servers and/or automotive clouds. The database 2 is associated with a system 3 supporting communication with one or more vehicles. The system 3 supporting communication with one or more vehicles here comprises the database updating system 1 as well as the database 2, and is further here represented by a vehicle managing system such as Volvo On Call.

Further shown in FIG. 1 is a first vehicle 4, which first vehicle 4 supports detection of vehicle surroundings. The exemplifying first vehicle 4 may at least partly comprise a traffic-affecting event verifying system 40, which will be described in greater detail further on in conjunction with FIGS. 6 and 7. The first vehicle 4 here comprises at least a first optional on-board surroundings detection device 41, here a camera, enabling the first vehicle 4 to observe a detected area 411, essentially in the travel direction of the first vehicle 4. It may be noted that according to alternative embodiments, further or alternative on-board surroundings detection devices may be utilized, for instance sensing the surroundings in alternative directions and/or even in 360 degrees around the first vehicle 4. The first vehicle 4 further here comprises an optional positioning system 42, enabling determination of a position 421 of the first vehicle 4. The position 421 may be provided to and/or be derived by the system 3 supporting communication with one or more vehicles, and the position 421 subsequently mapped onto a digital map e.g., stored in the one or more servers and or clouds discussed above.

Further shown in FIG. 1 is at least a first traffic-affecting event 5, which the first vehicle 4 is approaching. The first traffic-affecting event 5 is here represented by an exemplifying stationary, e.g., broken-down, vehicle in the rightmost lane of an exemplifying three-lane freeway 6, along which the first vehicle 4 is travelling in the leftmost lane. The traffic-affecting event 5 may additionally or alternatively be situated on and/or near a road 6, selected from the group consisting of an object affecting drivability and/or accessibility of the road 6, an accident, a slow-moving vehicle, a stationary vehicle, a vulnerable road user, an end of a queue of vehicles, a bad weather condition, debris and/or a pothole or the like. The first traffic-affecting event 5 has prior to the first vehicle 4 approaching the same been reported and subsequently stored in the database 2, with a stored position 21 of the event 5—which may be referred to as an expected position 21 of the event 5—indicating an estimated and/or established location thereof, e.g., in the exemplifying digital map discussed above. The traffic-affecting event 5 is by the first vehicle 4 detected and subsequently determined to be located at a position 51. The stored position 21 and the detected position 51 may—or may not—coincide.

Further shown in FIG. 1 is an exemplifying verification request message 11 prompting the first vehicle 4 to attempt to detect the first traffic-affecting event 5, and a response 12 from the first vehicle 4, both of which will be described in greater detail further on.

Figure 2:
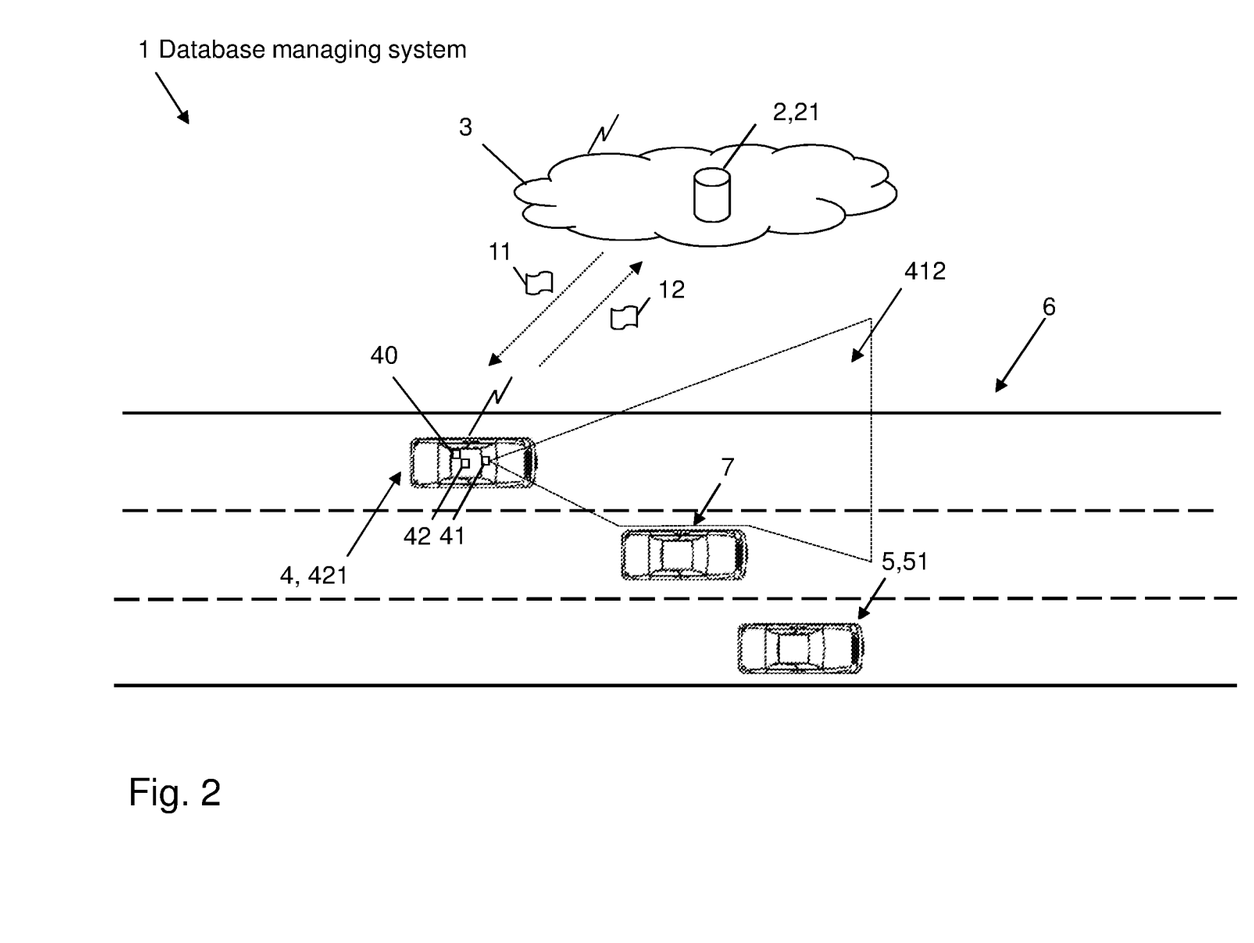
FIG. 2 illustrates a schematic overview of an obstructed detected area, obstructed by an obstructing object, according to embodiments of the disclosure.

FIG. 2 illustrates a schematic overview of an obstructed detected area 412, obstructed by an obstructing object 7, according to embodiments of the disclosure. The obstructing object 7 is here represented by a vehicle travelling in the middle lane of the three-lane freeway 6, and is as shown affecting the ability for the first vehicle 4 to observe the expected position 21 of the first traffic-affecting event 5, as will be explained further in conjunction with FIG. 5.

Figure 3:
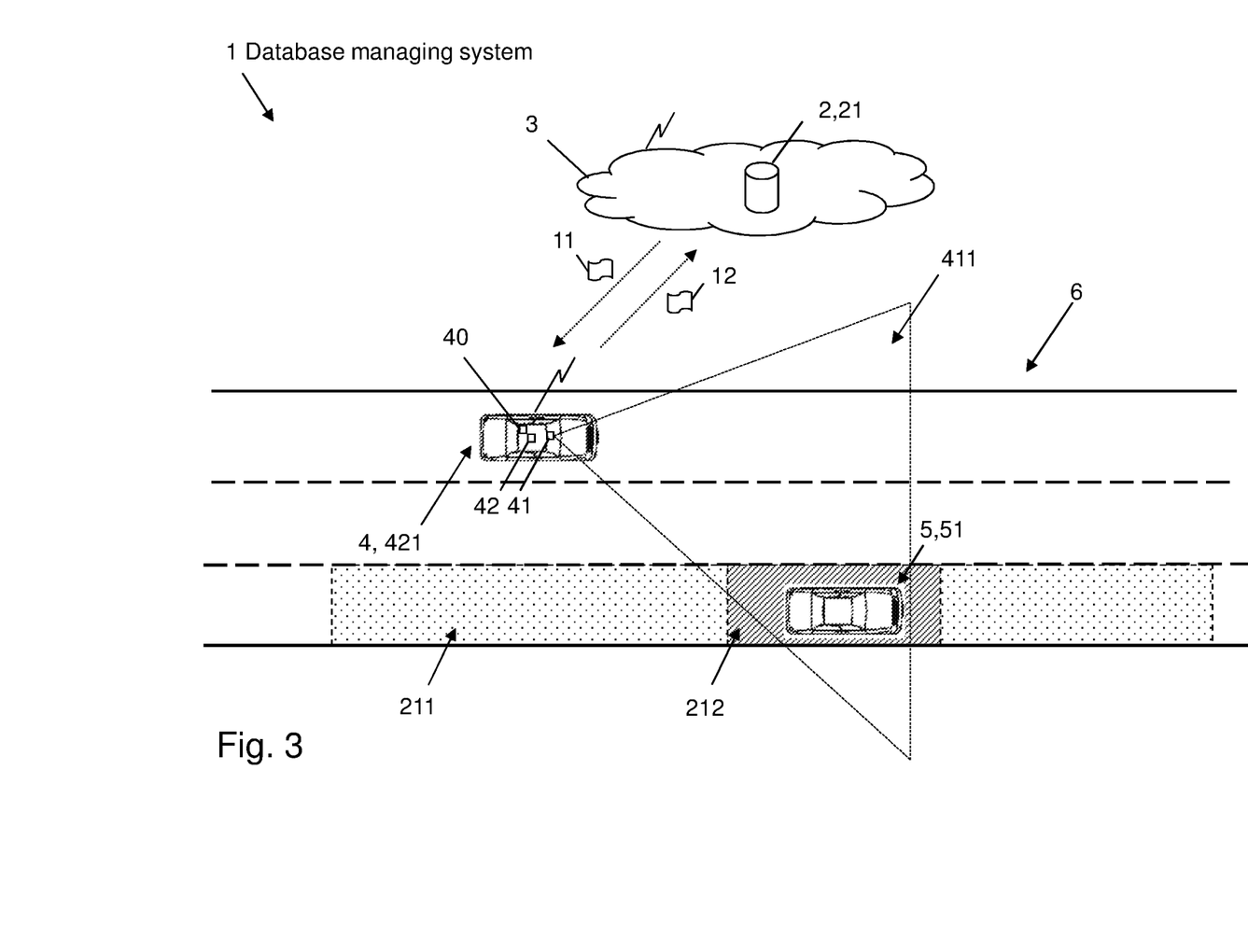
FIG. 3 illustrates a schematic overview of a fictive zone, according to embodiments of the disclosure.

FIG. 3 illustrates a schematic overview of an exemplifying optional fictive zone, according to embodiments of the disclosure. An initial fictive zone 211 as well as an updated narrowed down fictive zone 212 are depicted, both of which will be further described in conjunction with FIG. 5.

Figure 4:
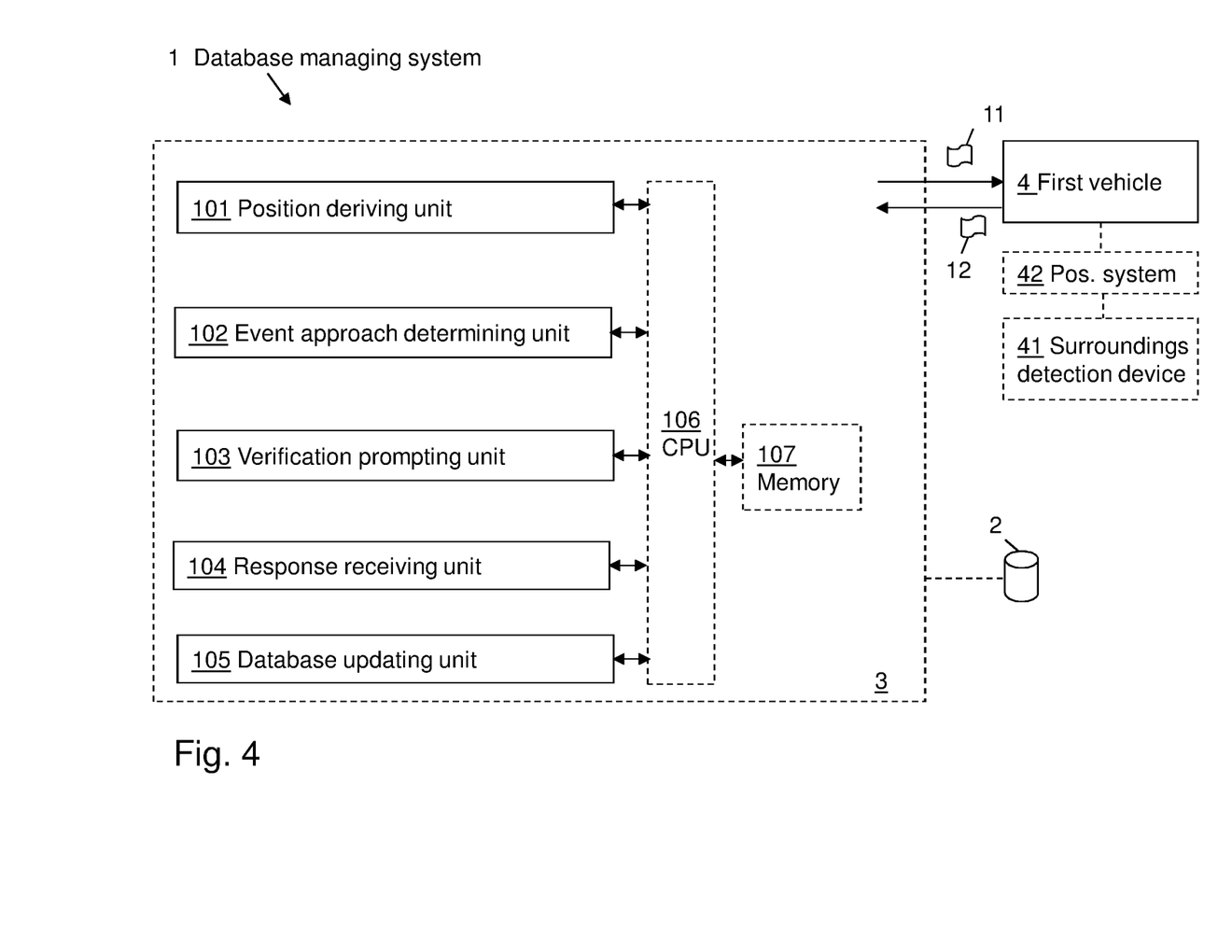
FIG. 4 is a schematic block diagram illustrating an exemplifying database managing system according to embodiments of the disclosure.
Figure 5:
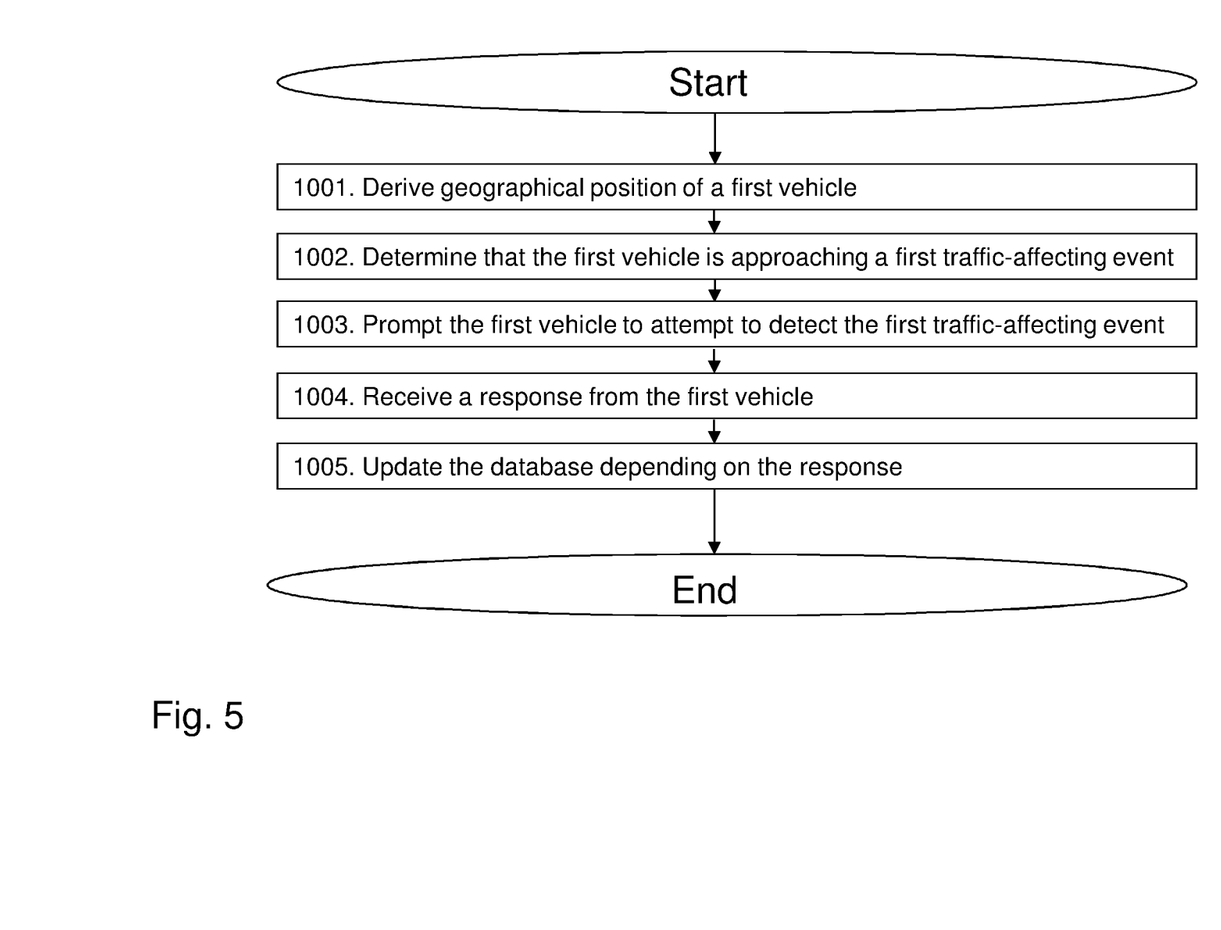
FIG. 5 is a flowchart depicting an exemplifying method—performed by a database managing system—for maintaining a database comprising reported traffic-affecting events, according to embodiments of the disclosure.

As further shown in FIG. 4, which depicts a schematic block diagram illustrating an exemplifying database managing system 1 according to embodiments of the disclosure, the database managing system 1 comprises a position deriving unit 101, an event approach determining unit 102, a verification prompting unit 103, a response receiving unit 104 and a database updating unit 105, all of which be described in greater detail in conjunction with FIG. 5.

Furthermore, the embodiments herein—relating to the database managing system 1—for maintaining a database 2 comprising reported traffic-affecting events, may be implemented through one or more processors, such as a processor 106, here denoted CPU, together with computer program code for performing the functions and actions of the embodiments herein. Said program code may also be provided as a computer program product, for instance in the form of a data carrier carrying computer program code for performing the embodiments herein when being loaded into the database managing system 1. One such carrier may be in the form of a CD ROM disc. It is however feasible with other data carriers such as a memory stick. The computer program code may furthermore be provided as pure program code on a server and downloaded to the database managing system 1.

The database managing system 1 may further comprise a memory 107 comprising one or more memory units. The memory 107 may be arranged to be used to store e.g., information, and further to store data, configurations, schedulings, and applications, to perform the methods herein when being executed in the database managing system 1. Furthermore, the position deriving unit 101, the event approach determining unit 102, the verification prompting unit 103, the response receiving unit 104, the database updating unit 105, the optional processor 106 and/or the optional memory 107 may for instance at least partly be implemented in one or more servers, in one or more automotive clouds, in a vehicle managing system discussed in the foregoing such as e.g., Volvo On Call, and/or in the system 3 supporting communication with one or more vehicles. Those skilled in the art will also appreciate that the position deriving unit 101, the event approach determining unit 102, the verification prompting unit 103, the response receiving unit 104 and/or the database updating unit 105 described above, and which will be described in more detail later on in this description, may refer to a combination of analog and digital circuits, and/or one or more processors configured with software and/or firmware, e.g., stored in a memory such as the memory 107, that when executed by the one or more processors such as the processor 106 perform as will be described in more detail in conjunction with FIG. 5. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

FIG. 5 is a flowchart depicting an exemplifying method—performed by a database managing system 1—for maintaining a database 2 comprising reported traffic-affecting events, according to embodiments of the disclosure. The database 2 is as explained above associated with a system 3 supporting communication with one or more vehicles. The exemplifying method, which may be continuously repeated, comprises the following actions discussed with support from FIGS. 1-4.

Action 1001

In Action 1001, the database managing system 1 derives—directly or indirectly—a position 421 of the first vehicle 4 supporting detection of vehicle surroundings. Correspondingly, the position deriving unit 101 is adapted for—directly or indirectly—deriving a position 421 of the first vehicle 4 supporting detection of vehicle surroundings. Thus, as shown with support at least from FIGS. 1 and 4, a location of a vehicle 4—which vehicle 4 is adapted to sense its environment—is established, for instance on the exemplifying digital map discussed above, e.g., with support from the traffic-affecting event verifying system 40 and/or the positioning system 42.

Action 1002

In Action 1002, the database managing system 1 determines by comparing the vehicle position 421 to positions of reported traffic-affecting events comprised in the database 2, that the first vehicle 4 is approaching at least a first traffic-affecting event 5. Correspondingly, the event approach determining unit 102 is adapted for determining by comparing the vehicle position 421 to positions of reported traffic-affecting events comprised in the database 2, that the first vehicle 4 is approaching at least a first traffic-affecting event 5. Thus, as shown with support at least from FIGS. 1 and 4, it may be established by considering the derived vehicle position 421 of the first vehicle 4 in view of database-stored positions of reported traffic-affecting events, for instance by comparison of the vehicle position 421 to positions in the exemplifying digital map discussed above, that said first vehicle 4 is heading toward—and/or has reached—a traffic-affecting event 5.

Action 1003

In Action 1003, the database managing system 1 prompts—directly or indirectly—the first vehicle 4 to attempt to detect the first traffic-affecting event 5, which prompting comprises providing to the first vehicle 4 an expected position 21 of the first traffic-affecting event 5. Correspondingly, the verification prompting unit 103 is adapted for prompting—directly or indirectly—the first vehicle 4 to attempt to detect the first traffic-affecting event 5, which prompting comprises providing to the first vehicle 4 an expected position 21 of the first traffic-affecting event 5. Thus, as shown with support at least from FIGS. 1 and 4, instructions 11 to try to verify the first traffic-affecting event 5 are provided—e.g., via the optional verification request message 11—to the first vehicle 4, for instance to the on-board traffic-affecting event verifying system 40 thereof.

Action 1004

In Action 1004, the database managing system 1 receives—directly or indirectly—a response 12 from the first vehicle 4. Correspondingly, the response receiving unit 104 is adapted for receiving—directly or indirectly—a response 12 from the first vehicle 4. The response 12 indicates whether or not the expected position 21 was at least partly unobstructedly observable by the first vehicle 4. The response 12 further indicates—if the expected position 21 was at least partly unobstructedly observable, whether or not the first traffic-affecting event 5 was at least partly detected by the first vehicle 4. Thus, as shown with support at least from FIGS. 1, 2 and 4, a response 12 is provided from the first vehicle 4—e.g., with support from the on-board traffic-affecting event verifying unit 40 thereof—to the database managing system 1 which reveals if the first vehicle 4 was able or not to—at least to some extent—unbstructedly observe the expected position 21. That is, the response 12 indicates whether or not the first vehicle 4 was able to observe—in an at least partly unobstructed manner, i.e., without for instance another vehicle 7, fog, etc., obstructing the ability to observe—the expected position 21. In the exemplifying embodiment of FIG. 1, the first vehicle 4 was able to unobstructedly observe the expected position 21, whereas in the exemplifying embodiment of FIG. 2, the first vehicle 4 was unable to unobstructedly observe the expected position 21. Accordingly, the database managing system 1 may derive from the response 12 whether or not e.g., an obstructing object 7 such as truck, and/or an obstructing condition such as fog and/or e.g., dirt on an optional on-board surroundings detections device 41, prevented the first vehicle 4 from observing said expected position 21. Consequently, since the received response 12 indicates if the first vehicle 4 was able to observe the expected position 21 of the first traffic-affecting event 5 or not as described above, the uncertainty arising in the prior art—when a vehicle supporting detection of vehicle surroundings passes by a reported traffic-affecting event without detecting and subsequently confirming and/or reporting said traffic-affecting event—of whether said traffic-affecting event is still valid or not, is mitigated. Moreover, thus, as shown with support at least from FIGS. 1 and 4, the response 12 from the first vehicle 4 to the database managing system 1 additionally reveals—in case said expected position 21 was at least partly unobstructedly observable as shown in FIG. 1—whether or not the first traffic-affecting event 5 at least to some extent was sensed by the first vehicle 4. In the exemplifying embodiment of FIG. 1, that was the case in that the first traffic-affecting event 5 was at least to some extent detected by the first vehicle 4, i.e., the first traffic-affecting event 5 was within the detected area 411.

Action 1005

In Action 10015 the database managing system 1 updates—in the database 2—information associated with the first traffic-affecting event 5, depending on the response 12. Correspondingly, the database updating unit 105 is adapted for updating—in the database 2—information associated with the first traffic-affecting event 5, depending on the response 12. Thus, as shown with support at least from FIGS. 1, 2 and 4, data related to the first traffic-affecting event 5 is updated in the database in dependence of the content of the response 12. Accordingly, as the response 12 indicates a potential inability to observe the expected position 21 of the first traffic-affecting event 5, as shown in FIG. 2, the database managing system 1 may update information of the database 2 related to the first traffic-affecting event 5, with greater confidence as compared to approaches in the prior art. That is, said information, such as the presence of the event 5 in the database 2 and/or a stored position 21 thereof, may for instance be modified, deleted, confirmed, verified and/or validated. It may moreover be noted—as shown with support from at least FIG. 2—that the database 2 not necessarily is updated, should for instance the response 12 indicate that the expected position 21 was not at least partly unobstructedly observable by the first vehicle 4. That is, if the response 12 indicates that the expected position 21 was not at least partly unobstructedly observable by the first vehicle 4, then nor would the first vehicle 4 have been able to detect the first traffic-affecting event 5.

Optionally, Action 1005 of updating may further comprise—and/or the database updating unit 105 may further be adapted for—evaluating deleting the reported first traffic-affecting event from the database 2, when the response 12 indicates:

that the expected position 21 was at least partly unobstructedly observable by the first vehicle 4, and that the first traffic-affecting event 5 was not detected by the first vehicle 4.

Thus, as shown with support at least from FIG. 4, the reported first traffic-affecting event 5 may be considered to be deleted from the database 2 with great and/or satisfying confidence, since the response 12 reveals that the first vehicle 4 was able to satisfyingly observe the expected position 21 of the first traffic-affecting event 5 and further that the traffic-affecting event 5 was not detected (not shown)—thus not present or valid and/or no longer present or valid—at the expected position 21.

Additionally or alternatively, optionally, the response 12 may further indicate a position 51—detected by the first vehicle 4—of the first traffic-affecting event 5. Action 1005 of updating may then further optionally comprise modifying and/or confirming in the database 2 a currently stored position 21 of the first traffic-affecting event 5, based on the position 51 indicated by the response. Correspondingly, the database updating unit 105 may then optionally further be adapted for modifying and/or confirming in the database 2 a currently stored position 21 of the first traffic-affecting event 5, based on the position 51 indicated by the response 12. Thus, as shown with support at least from FIGS. 1 and 4, the currently stored position 21 of the first traffic-affecting event 5 may be modified and/or confirmed taking into consideration the position 51 of the first traffic-affecting event 5 detected by the first vehicle 4 and subsequently revealed by the response 12. For instance, the position 21 may be modified in a lateral and/or longitudinal direction of a road 6 along which the first vehicle 4 is travelling.

Moreover, Action 1005 of updating may optionally further comprise updating in the database 2, based on the position 51 indicated by the response 12, one or more outer boundaries of a fictive zone 211 comprising the first traffic-affecting event 5, in which fictive zone 211 partial or fully autonomous driving is at least partly restricted. Correspondingly, the database updating unit 105 may further optionally be adapted for updating in the database 2, based on the position 51 indicated by the response 12, one or more outer boundaries of a fictive zone 211 comprising the first traffic-affecting event 5, in which fictive zone 211 partial or fully autonomous driving is at least partly restricted. Thus, as shown with support at least from FIGS. 3 and 4, a previously set hypothetical safety zone 211 surrounding and/or encompassing the first traffic-affecting event 5, in which zone 211 partial or fully autonomous driving to some extent may be prohibited due to relative nearness to the first traffic-affecting event 5, may be adjusted and/or narrowed down 212 to better reflect the position 51 of the first traffic-affecting event 5 detected by the first vehicle 4. That is, a fictive zone 211 comprising the first traffic-affecting event 5—such as e.g., a road section—initially reported to and set in the database 2 for instance by an emergency service, may e.g., extend along a sometimes unnecessarily extensive stretch of road, due to e.g., uncertainties regarding the position of the first traffic-affecting event 5. Thus, upon updating 212 outer limits of such a fictive zone 211 based on the position 51 indicated by the response, the zone 211 in which partial or fully autonomous driving at least to some extent is restricted, is adjusted 212 to better reflect the location 51 of the first traffic-affecting event 5 detected by the first vehicle 4.

Figure 6:
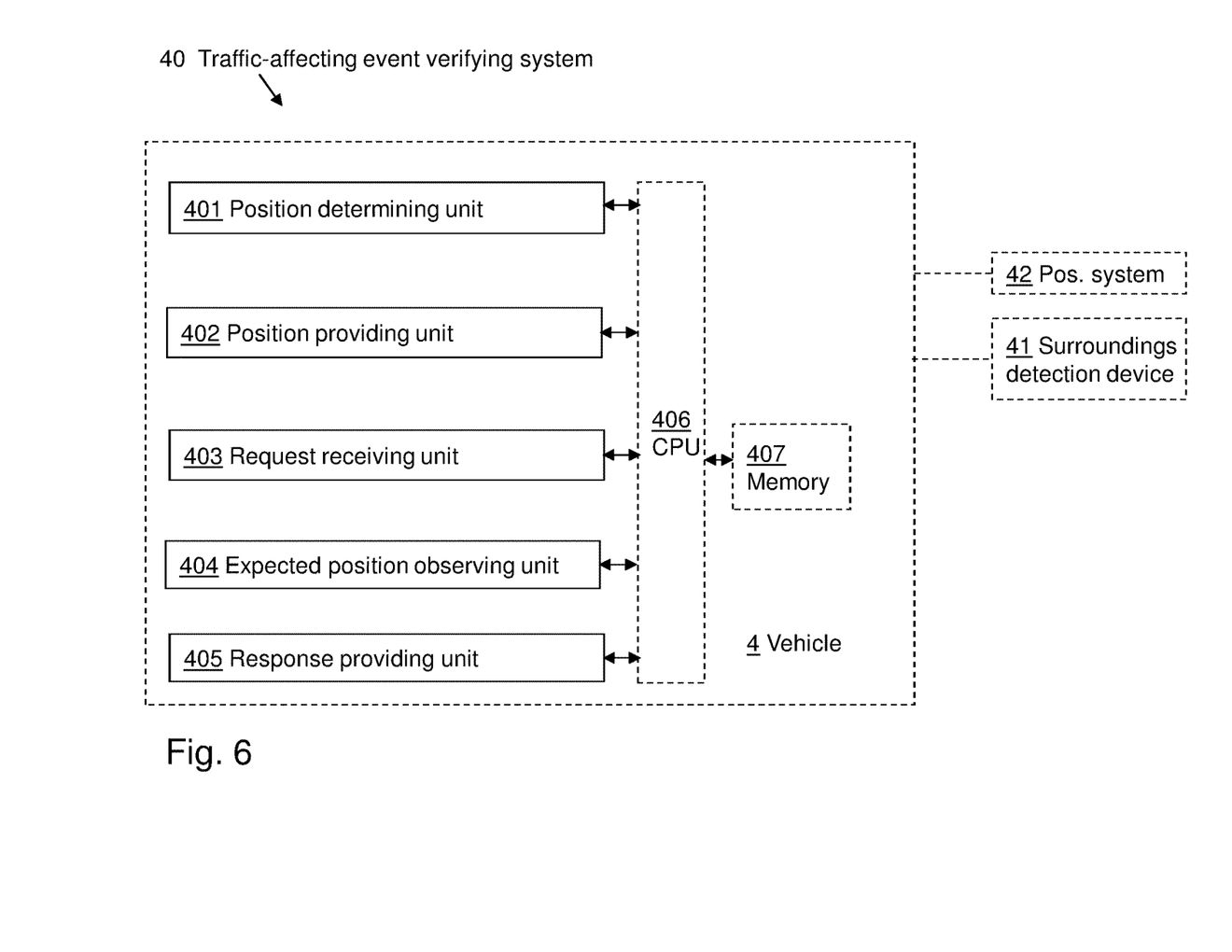
FIG. 6 is a schematic block diagram illustrating an exemplifying traffic-affecting event verifying system onboard the first vehicle, according to embodiments of the disclosure.
Figure 7:
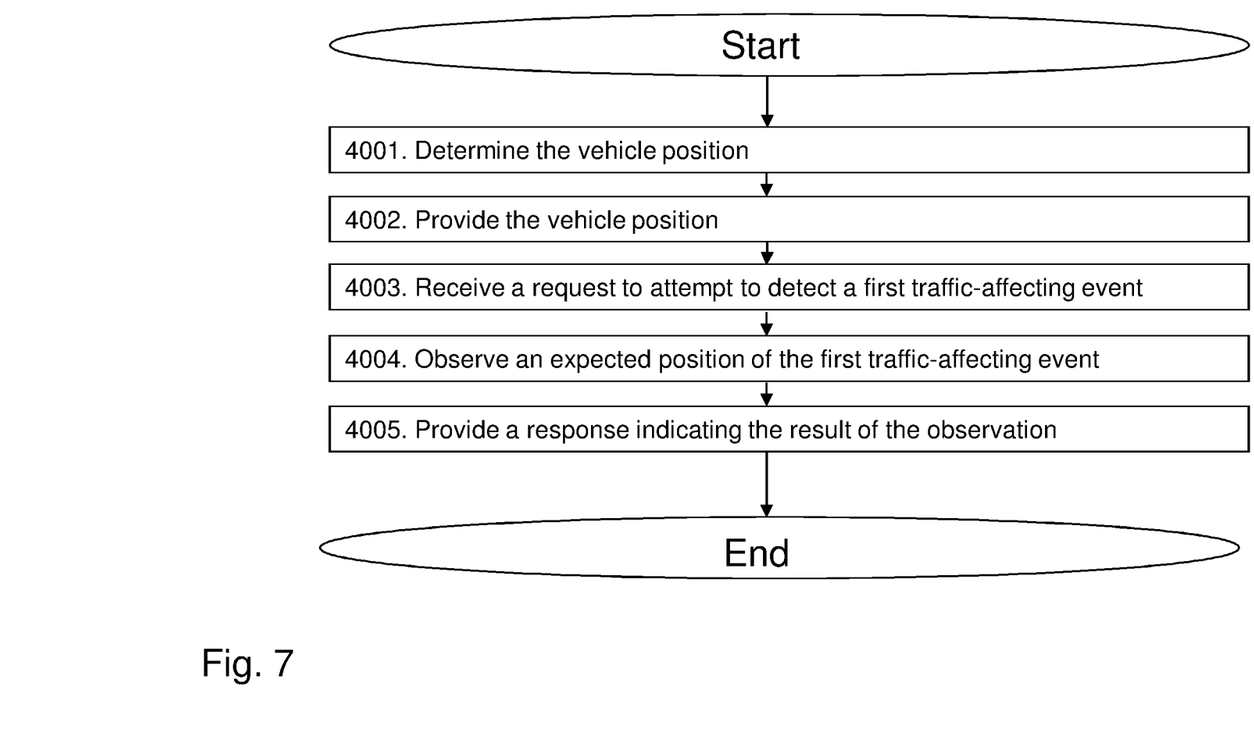
FIG. 7 is a flowchart depicting an exemplifying method—performed by a traffic-affecting event verifying system onboard a vehicle supporting detection of vehicle surroundings—for maintaining a database comprising reported traffic-affecting events, according to embodiments of the disclosure.

As further shown in FIG. 6, which depicts a schematic block diagram illustrating an exemplifying traffic-affecting event verifying system 40 on-board the first vehicle 4, according to embodiments of the disclosure, the traffic-affecting event verifying system 40 comprises a position determining unit 401, a position providing unit 402, a request receiving unit 403, an expected position observing unit 404 and a response providing unit 405, all of which be described in greater detail in conjunction with FIG. 7.

Furthermore, the embodiments herein—relating to the traffic-affecting event verifying system 40—for maintaining a database 2 comprising reported traffic-affecting events, may be implemented through one or more processors, such as a processor 406, here denoted CPU, together with computer program code for performing the functions and actions of the embodiments herein. Said program code may also be provided as a computer program product, for instance in the form of a data carrier carrying computer program code for performing the embodiments herein when being loaded into the traffic-affecting event verifying system 40. One such carrier may be in the form of a CD ROM disc. It is however feasible with other data carriers such as a memory stick. The computer program code may furthermore be provided as pure program code on a server and downloaded to the traffic-affecting event verifying system 40.

The traffic-affecting event verifying system 40 may further comprise a memory 407 comprising one or more memory units. The memory 407 may be arranged to be used to store e.g., information, and further to store data, configurations, schedulings, and applications, to perform the methods herein when being executed in the traffic-affecting event verifying system 40. Furthermore, the position determining unit 401, the position providing unit 402, the request receiving unit 403, the expected position observing unit 404, the response providing unit 405, the optional processor 406 and/or the optional memory 407 may for instance at least partly be implemented in the first vehicle 4, e.g., in one or more electronic control units (ECUs) thereof, and/or be provided on-board the first vehicle 4. Those skilled in the art will also appreciate that the position determining unit 401, the position providing unit 402, the request receiving unit 403, the expected position observing unit 404 and/or the response providing unit 405 described above, and which will be described in more detail in conjunction with FIG. 7, may refer to a combination of analog and digital circuits, and/or one or more processors configured with software and/or firmware, e.g., stored in a memory such as the memory 407, that when executed by the one or more processors such as the processor 406 perform as will be described in more detail later on. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

FIG. 7 is a flowchart depicting an exemplifying method—performed by a traffic-affecting event verifying system 40 onboard a vehicle 41 supporting detection of vehicle surroundings—for maintaining a database 2 comprising reported traffic-affecting events, according to embodiments of the disclosure. The database 2 is as explained above associated with a system 3 supporting communication with one or more vehicles. The exemplifying method, which may be continuously repeated, comprises the following actions discussed with support at least from FIGS. 1, 2 and 6.

Action 4001

In Action 4001, the traffic-affecting event verifying system 40 determines a position 421 of the vehicle 4. Correspondingly, the position determining unit 401 is adapted for determining a position 421 of the vehicle 4. Thus, as shown with support at least from FIGS. 1 and 6, determining the vehicle position 421 may be accomplished, e.g., with support from the positioning system 42 on-board the first vehicle 1.

Action 4002

In Action 4002, the traffic-affecting event verifying system 40 provides the vehicle position 421. Correspondingly, the position providing unit 402 is adapted for providing the vehicle position 421. Thus, as shown with support at least from FIGS. 1 and 6, the vehicle position 421 may be provided to e.g., to the database managing system 1 and/or the system 3 supporting communication with one or more vehicles.

Action 4003

In Action 4003, the traffic-affecting event verifying system 40 receives a request 11 to attempt to detect at least a first traffic-affecting event 5, which the vehicle 4 is approaching. Correspondingly, the request receiving unit 403 is adapted for receiving a request 11 to attempt to detect at least a first traffic-affecting event 5, which the vehicle 4 is approaching. The request 11 comprises an expected position 21 of the first traffic-affecting event 5. Thus, as shown with support at least from FIGS. 1 and 6, the request 11 to attempt to detect at least a first traffic-affecting event 5 may be provided e.g., from the database managing system 1 and/or the system 3 supporting communication with one or more vehicles.

Action 4004

In Action 4004, the traffic-affecting event verifying system 40 observes the expected position 21. Correspondingly, the expected position observing unit 404 is adapted for observing the expected position 21. Thus, as shown with support at least from FIGS. 1, 2 and 6, observing the expected position 21 may be accomplished with support from the one or more optional on-board surroundings detection devices 41. In the embodiment of FIG. 1, the expected position 21 is within the detected area 411, whereas in the embodiment of FIG. 2, the expected position 21 is not within the obstructed detected area 412.

Action 4005

In Action 4005, the traffic-affecting event verifying system 40 provides a response 12. Correspondingly, the response providing unit 405 is adapted for providing a response 12. The response 12 indicates whether or not the expected position 21 was at least partly unobstructedly observable by the vehicle 4. In the embodiment of FIG. 1, the expected position 21 was at least partly unobstructedly observable by the vehicle 4, whereas in the embodiment of FIG. 2, the expected position 21 was not at least partly unobstructedly observable by the vehicle 4. The response 12 further comprises—if the expected position 21 was at least partly unobstructedly observable as shown in FIG. 1—whether or not the first traffic-affecting event 5 was at least partly detected by the vehicle 4. In the exemplifying embodiment of FIG. 1, that was the case, i.e., the first traffic-affecting event 5 was at least partly detected by the vehicle 4. As shown with support from at least FIGS. 1 and 6, the response 12 may be provided to e.g., the database managing system 1 and/or the system 3 supporting communication with one or more vehicles.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

What is claimed is:

1. A method performed by a database managing system for maintaining a database comprising reported traffic-affecting events, the database being associated with a system supporting communication with one or more vehicles, the method comprising:
    deriving a position of a first vehicle supporting detection of vehicle surroundings;
    determining by comparing the vehicle position to positions of reported traffic-affecting events comprised in the database, that the first vehicle is approaching at least a first traffic-affecting event;
    prompting the first vehicle to attempt to detect the first traffic-affecting event, the prompting comprising providing to the first vehicle an expected position of the first traffic-affecting event;
    receiving a response from the first vehicle, the response indicating:
        whether the expected position was at least partly unobstructedly observable by the first vehicle; and
        if the expected position was at least partly unobstructedly observable, whether the first traffic-affecting event was at least partly detected by the first vehicle; and
    updating, in the database, information associated with the first traffic-affecting event, depending on the response.

2. The method according to claim 1 wherein the updating further comprises evaluating deleting the reported first traffic-affecting event from the database when the response indicates:
    that the expected position was at least partly unobstructedly observable by the first vehicle, and
    that the first traffic-affecting event was not detected by the first vehicle.

3. The method according to claim 1 wherein the response further indicates a position—detected by the first vehicle—of the first traffic-affecting event, wherein the updating further comprises modifying or confirming in the database a currently stored position of the first traffic-affecting event, based on the position indicated by the response.

4. The method according to claim 3 wherein the updating further comprises updating in the database, based on the position indicated by the response, one or more outer boundaries of a fictive zone comprising the first traffic-affecting event, in which fictive zone partial or fully autonomous driving is at least partly restricted.

5. The method according to claim 4 wherein the first traffic-affecting event is situated on or near a road, and comprises:
    an accident;
    a slow-moving vehicle;
    a stationary vehicle;
    a vulnerable road user;
    an end of a queue of vehicles;
    a bad weather condition;
    debris; or
    a pothole.

6. The method according to claim 1 wherein the first traffic-affecting event is situated on or near a road, and comprises:
    an accident;
    a slow-moving vehicle;
    a stationary vehicle;
    a vulnerable road user;
    an end of a queue of vehicles;
    a bad weather condition;
    debris; or
    a pothole.

7. A database managing system for maintaining a database comprising reported traffic-affecting events, the database being associated with a system supporting communication with one or more vehicles, the database managing system comprising:
    a position deriving unit configured to derive a position of a first vehicle supporting detection of vehicle surroundings;
    an event approach determining unit configured to determine, by comparing the vehicle position to positions of reported traffic-affecting events comprised in the database, that the first vehicle is approaching at least a first traffic-affecting event;
    a verification prompting unit configured to prompt the first vehicle to attempt to detect the first traffic-affecting event, the prompt comprising providing to the first vehicle an expected position of the first traffic-affecting event;
    a response receiving unit configured to receive a response from the first vehicle, the response indicating:
        whether the expected position was at least partly unobstructedly observable by the first vehicle; and
        if the expected position was at least partly unobstructedly observable, whether the first traffic-affecting event was at least partly detected by the first vehicle; and
    a database updating unit configured to update, in the database, information associated with the first traffic-affecting event, depending on the response.

8. The database managing system according to claim 7 wherein the database updating unit further is configured to evaluate deleting the reported first traffic-affecting event from the database when the response indicates:
    that the expected position was at least partly unobstructedly observable by the first vehicle, and
    that the first traffic-affecting event was not detected by the first vehicle.

9. The database managing system according to claim 7 wherein the response further indicates a position—detected by the first vehicle—of the first traffic-affecting event, wherein the database updating unit further is configured to modify or confirm in the database a currently stored position of the first traffic-affecting event, based on the position indicated by the response.

10. The database managing system according to claim 9 wherein the database updating unit further is configured to update in the database, based on the position indicated by the response, one or more outer boundaries of a fictive zone comprising the first traffic-affecting event, in which fictive zone partial or fully autonomous driving is at least partly restricted.

11. The database managing system according to claim 10 wherein the first traffic-affecting event is situated on or near a road, and comprises:
    an accident;
    a slow-moving vehicle;
    a stationary vehicle;
    a vulnerable road user;
    an end of a queue of vehicles;
    a bad weather condition;
    debris; or
    a pothole.

12. The database managing system according to claim 7 wherein the first traffic-affecting event is situated on or near a road, and comprises:
    an accident;
    a slow-moving vehicle;
    a stationary vehicle;
    a vulnerable road user;
    an end of a queue of vehicles;
    a bad weather condition;
    debris; or
    a pothole.

13. The database managing system according to claim 7 wherein the database managing system is at least partly comprised in one or more servers or automotive clouds.

14. A computer program product comprising a computer program including computer program code means configured to cause a computer or a processor to execute steps of the method according to claim 1, stored on a computer-readable medium.

15. A method, performed by a traffic-affecting event verifying system on-board a vehicle supporting detection of vehicle surroundings, for maintaining a database comprising reported traffic-affecting events, the database being associated with a system supporting communication with one or more vehicles, the method comprising:
    determining a position of the vehicle;
    providing the vehicle position;
    receiving a request to attempt to detect at least a first traffic-affecting event, which the vehicle is approaching, the request comprising an expected position of the first traffic-affecting event;
    observing the expected position; and
    providing a response, the response indicating:
        whether the expected position was at least partly unobstructedly observable by the vehicle; and
        if the expected position was at least partly unobstructedly observable, whether the first traffic-affecting event was at least partly detected by the vehicle.

16. A traffic-affecting event verifying system, for use on-board a vehicle supporting detection of vehicle surroundings, for maintaining a database comprising reported traffic-affecting events, the database being associated with a system supporting communication with one or more vehicles, the traffic-affecting event verifying system comprising:
    a position determining unit configured to determine a position of the vehicle;
    a position providing unit configured to provide the vehicle position;
    a request receiving unit configured to receive a request to attempt to detect at least a first traffic-affecting event, which the vehicle is approaching, the request comprising an expected position of the first traffic-affecting event;
    an expected position observing unit configured to observe the expected position; and
    a response providing unit configured to provide a response, the response indicating:
        whether the expected position was at least partly unobstructedly observable by the vehicle; and
        if the expected position was at least partly unobstructedly observable, whether the first traffic-affecting event was at least partly detected by the vehicle.

17. A vehicle comprising the traffic-affecting event verifying system according to claim 16, the vehicle supporting detection of vehicle surroundings.

18. The method according to claim 1 wherein the first traffic-affecting event is situated on or near a road, and comprises an object affecting drivability or accessibility of the road.

19. The method according to claim 4 wherein the first traffic-affecting event is situated on or near a road, and comprises an object affecting drivability or accessibility of the road.

20. The database managing system according to claim 7 wherein the first traffic-affecting event is situated on or near a road, and comprises an object affecting drivability or accessibility of the road.

* * * * *